Aug. 19, 1952  W. A. SASSE  2,607,602
CHUCK
Filed Aug. 25, 1950
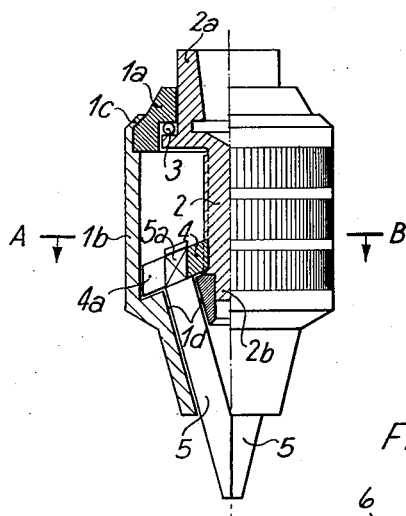
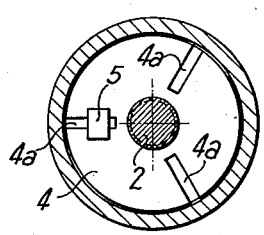
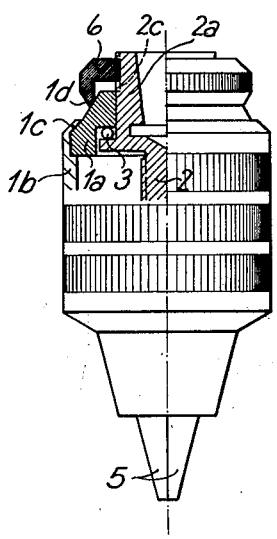
Inventor
Willi August Sasse
BY Burgess + Dinklage
Attorneys Patented Aug. 19, 1952

2,607,602

UNITED STATES PATENT OFFICE 2,607,602

CHUCK

Willi August Sasse, Hamburg-Othmarschen, Germany, assignor to Continental Laboratories, Inc., New York, N. Y., a corporation Application August 25, 1950, Serial No. 181,380
In Germany July 12, 1950

10 Claims. (Cl. 279—60)

This invention relates to chucks for drill presses or the like and more particularly to hand operated chucks which render unnecessary the application of a wrench for chucking and unchucking operations.

Besides the well known chucks requiring a wrench for their operation, hand operated drill-chucks are also in use at present having their jaws, which are embedded and guided within the chuck body, slidingly actuated in a direction somewhat inclined toward the axis or rotation of the chuck by a threaded collar arranged outside around the chuck body. Such conventional wrenchless chucks, however, are rather complicated in construction and comprise quite a number of parts. Furthermore, does their chucking grip in most cases not attain such value as would be desirable for positive chucking or, in other words, the drill or chucked part tends to slip.

The present invention differs from conventional chuck constructions in that the actuation of the chucking jaws is effected by a chuck disk which threadingly engages a spindle arranged rotatably about the axis of the chuck body and by means of which the chuck disk is slidingly moved within the cylindrical portion of said chuck body when the latter is turned, and which spindle in turn has an extension adapted to be secured to the drill press spindle or other operating means. The chuck disk is provided with a threaded opening at its center to engage the chuck spindle and with radial slots at its outer portion which engage the upper portions of the jaws which thereby are radially slidably but non-rotatably secured to said disk. The lower portions of the chucking jaws are guided within cylindrical holes which extend, in a direction somewhat inclined toward the axis of rotation, through the lower portion of the chuck body.

It is a feature of this invention that by engagement of the chuck disk with the jaws, the latter are rendered non-rotatable; and that in turn by inserting the jaws in their guide holes, the chuck disk is rendered non-rotatable.

Besides the advantage that the chuck of the present invention consists substantially of only five parts permitting a very simple assembly and cheap manufacture, it provides as another feature proper alignment between chuck spindle and body and a uniform concentrical movement of the jaws during chucking operation.

Novelties of construction and other advantages will become apparent from the following description and the accompanying drawing showing two preferred embodiments of the invention and in which Fig. 1 shows the drill-chuck partly in section to indicate the inside construction;

Fig. 2 is a cross-section at the line A—B of Fig. 1;

Fig. 3 shows a chuck jaw as viewed from the center axis of the chuck; and

Fig. 4 is a modification of the chuck as applied for thread cutting with a knurled lock collar guarding against unchucking during counter-rotation.

The chuck body consists of parts $1a$ and $1b$ which are joined at $1c$ by means of threads or in any other suitable manner. Concentrically arranged in the axis of the chuck body is the threaded chuck spindle 2 which is journaled in the upper part $1a$ by means of a ball bearing 3 and in the lower part $1b$ by a reduced extremity $2b$. The chuck spindle 2 is additionally guided in part $1a$ by a cylindrical portion $2a$ which is also provided with a taper socket or other fastening means for attachment to a drill press spindle not shown on the drawing. Axially slidably but non-rotatably disposed within the cylindrical portion of the chuck body is the inside-threaded annular chuck disk 4 which engages the threads of the chuck spindle 2 and is thus urged to move axially when relative rotation between spindle 2 and chuck body $1a$—$1b$ is effected. It will be noted that in the example shown, the chuck disk 4 is dished upward and has radial slots $4a$ around its outer portion (see Fig. 2). The jaws 5, of substantially cylindrical cross-section, have oppositely located lateral slots milled into their upper portions whereby flattened sections $5a$ (Fig. 3) are produced which engage the radial slots $4a$ of disk 4. Thus the jaws 5 may slide freely in radial direction in slots $4a$ but are prevented from turning and from axial movement in relation to disk 4. Holes $1c$ are drilled through the relatively thick bottom of part $1b$ of the chuck body which are equidistantly spaced and inclined toward the axis of rotation of the chuck as may be seen in Fig. 1. The jaws 5, inserted into holes $1c$, are slidably guided therein and project with their lower portions beyond the bottom face of the chuck body. It will be noted that with the jaws 5 inserted in holes $1c$, disk 4 is prevented from rotation and that, as mentioned above, the jaws 5 are rendered non-rotatable by engagement with disk 4. The inclination of the dished portion of disk 4 is preferably such that both surfaces lie substantially perpendicularly to the axis of the inclined guide holes $1c$ and the jaws 5.

Fig. 1 illustrates the chuck with a jaw 5 in closed position. Should the chuck be opened, the spindle of the drill press and in connection therewith the threaded chuck spindle 2 of the chuck are detained and the chuck body $1a$—$1b$ is turned by hand. If left hand thread is cut on spindle 2, which is to be preferred, the chuck body has to be turned counterclockwise to open the chuck. To provide a sure grip on the chuck body the circumferential surface of it is preferably knurled.

While chuck body 1a—1b is rotated, chuck disk 4, turning with it, ascends within said chuck body due to the threading engagement with chuck spindle 2. As jaws 5 in turn are engaging chuck disk 4, they are also urged upward thereby receding and moving radially outward due to inclined direction of the guide holes 1c, thus opening the chuck. Turning the chuck body in opposite direction, causes chuck disk 4 to descend urging jaws 5 down and inward, thus closing the chuck.

In the modification of this invention as shown in Fig. 3, the cylindrical portion 2a of chuck spindle 2 is somewhat extended and provided with outside-threads 2c. An outside-knurled lock collar 6 is screwed onto threads 2c by means of which chuck body 1a—1b can be locked with chuck spindle 2 by frictional engagement at 1d, permitting rotation of the chuck body in both directions without fear of unchucking. Thus the chuck is made applicable for thread cutting also.

While the embodiments of the invention shown on the drawing are limited to three jaws, it is obvious that more than three jaws may be provided without departing from the principle of this invention. It is also to be understood that other modifications and changes of construction may be made which do not depart from the spirit and scope of the invention as disclosed in the appended claims.

What I claim is:

1. In a multiple jaw drill chuck, the improvement comprising a chuck body, a threaded chuck spindle within said body and substantially co-axial with the axis of rotation of said body and being rotatable relative to said chuck body, chuck member means around and threadedly engaging said spindle, means defining a space within said chuck body around said chuck member means and permitting the same to be threaded up and down said spindle, means defining substantially equidistantly-spaced slots in the periphery of said chuck member means and substantially radially extending with respect to said axis, multiple chuck jaws, one for each of said slots and each slidingly guided in said chuck body in a downward direction toward said axis and each transversely slidable with its upper end in its said slot, stop means carried by the upper end of each jaw preventing appreciable vertical movement thereof, and means cooperating with said chuck body for substantially preventing rotary motion of said chuck member means relative to said body.

2. Improvement according to claim 1 in which said means for preventing rotary motion of said chuck member means include guide apertures for said chuck jaws defined by a lower part of said chuck body and having jaw bearing surfaces downwardly inclined toward said axis.

3. In a multiple drill chuck, the improvement comprising a chuck body defining an inner substantially cylindrical space co-axial with the center of rotation of said chuck, a threaded chuck spindle extending into said hollow portion substantially co-axial therewith and rotatable relative to said chuck body, a chuck disc in threaded engagement with said spindle and axially movable within said space and provided with three substantially symmetrically spaced peripheral radial slots, three guide openings defined within the lower part of said chuck body and extending from said space with their inner surfaces in substantial alignment with said slots in a downward direction toward said axis, three chuck jaws one for each of said apertures and each passing through its aperture and with its upper portion through its radial slot, and stop means carried at the upper end of each of said chuck jaws preventing substantial vertical movement thereof relative said disc without preventing thereto transverse movement in said slot.

4. The improvement according to claim 3 in which said chuck disc is substantially dished with its downwardly declining sides substantially perpendicular to the axis of inclination of said chuck jaws within said apertures.

5. Improvement according to claim 4 in which said means for preventing the upper portions of said jaws from substantial vertical movement relative said disc include a recessed portion at the upper end of each chuck jaw transversely slidably engaging said slots and defining an upper and lower shoulder for stop engagement with said disc.

6. Improvement according to claim 5 in which the chuck body bears against a ball bearing mounted on the chuck spindle and the latter is concentrically journaled within the chuck body by cylindrical portions at each of its two extremities.

7. Improvement according to claim 6 in which a threaded lock collar engages outside-threads provided on the upper extremity of the chuck spindle to effect a locking action between the latter and the chuck body.

8. Improvement according to claim 3 in which the chuck body bears against a ball bearing mounted on the chuck spindle and the latter is concentrically journaled within the chuck body by cylindrical portions at each of its two extremities.

9. Improvement according to claim 3 in which a threaded lock collar engages outside-threads provided on the upper extremity of the chuck spindle to effect a locking action between the latter and the chuck body.

10. Improvement according to claim 9 in which said chuck disc is substantially dished with its downwardly declining sides substantially perpendicular to the axis of inclination of said chuck jaws within said apertures.

WILLI AUGUST SASSE.

REFERENCES CITED

The following references are of record in the file of this patent:

UNITED STATES PATENTS

| Number | Name | Date |
|---|---|---|
| 722,575 | Gates | Mar. 10, 1903 |
| 879,741 | Coit | Feb. 18, 1908 |
| 2,292,470 | Ostberg | Aug. 11, 1942 |

FOREIGN PATENTS

| Number | Country | Date |
|---|---|---|
| 583,004 | Great Britain | Dec. 4, 1946 |